United States Patent [19]

Meister et al.

[11] Patent Number: 5,442,048
[45] Date of Patent: Aug. 15, 1995

[54] PROCESS FOR THE PREPARATION OF ACTIVATED CHITOSANS AND THEIR USE IN THE PREPARATION OF CHIOTSAN DERIVATIVES

[75] Inventors: Christoph Meister, Wiesbaden; Reinhard Dönges, Bad Soden am Taunus, both of Germany

[73] Assignee: Hoechst AG, Frankfurt, Germany

[21] Appl. No.: 166,738

[22] Filed: Dec. 14, 1993

Related U.S. Application Data

[63] Continuation of Ser. No. 476,263, Feb. 7, 1990, abandoned.

[30] Foreign Application Priority Data

Feb. 9, 1989 [DE] Germany .................... 39 03 797.5

[51] Int. Cl.$^6$ .................... C08B 37/08; C07H 1/00
[52] U.S. Cl. .................... 536/20; 536/55.2; 536/55.3; 536/124
[58] Field of Search ............... 536/20, 124, 55.2, 55.3

[56] References Cited

U.S. PATENT DOCUMENTS

| | | | |
|---|---|---|---|
| 4,424,346 | 1/1984 | Hall et al. | 536/20 |
| 4,436,731 | 3/1984 | Maltz | 536/20 |
| 4,772,689 | 9/1988 | Lang et al. | 536/20 |
| 4,772,690 | 9/1988 | Lang et al. | 536/20 |

(List continued on next page.)

FOREIGN PATENT DOCUMENTS

| | | |
|---|---|---|
| 0065491 | 11/1982 | European Pat. Off. . |
| 0115574 | 8/1984 | European Pat. Off. . |
| 3501891 | 7/1986 | European Pat. Off. . |
| 3502833 | 7/1986 | European Pat. Off. . |
| 0224045 | 6/1987 | European Pat. Off. . |
| 0249779 | 12/1987 | European Pat. Off. . |

(List continued on next page.)

OTHER PUBLICATIONS

Muzzarelli, R. A. A., Chitin, Oxford, Eng., Pergamon Press Ltd., 1977, pp. 267–303.
Fujii, S. et al., Carb. Res. 83:389–393 (1980).
Hall, L. D. et al., J.C.S. Chem. Comm, 1980.
Moore, G. K. et al., Int. J. Biol. Macromol. 3:292–296 (1981).
Moore, G. K. et al., Int. J. Biol. Macromol. 4:246–249 (1982).
Muzzarelli, R. A. A., Carbohydrate Polymers 3:53–75 (1983).
Muzzarelli, R. A. A., et al., J. Membrane Sci. 16:295–308 (1983).

(List continued on next page.)

Primary Examiner—David A. Redding
Assistant Examiner—Everett White
Attorney, Agent, or Firm—Connolly & Hutz

[57] ABSTRACT

The invention relates to a process for the preparation of activated chitosans, in which process a chitosan is reacted with an acid for salt formation, preferably followed by a reaction with a base. The addition of acid and the addition of bases which is preferably to be effected in the activation are carried out in a suspending agent which largely prevents the chitosan salts from dissolving, suitable suspending agents can be both aqueous solutions of inorganic salts and organic or aqueous-organic solvents. The invention also relates to a process for the preparation of both water-soluble and water-insoluble chitosan derivatives by reacting the activated chitosans with reagents which are generally suitable for the reaction of polysaccharides or amines.

19 Claims, No Drawings

U.S. PATENT DOCUMENTS

| | | | |
|---|---|---|---|
| 4,780,310 | 10/1988 | Lang et al. | 536/20 |
| 4,845,204 | 7/1989 | Lang et al. | 536/20 |
| 4,923,777 | 5/1990 | Imai et al. | 430/120 |

FOREIGN PATENT DOCUMENTS

| | | |
|---|---|---|
| 0265561 | 5/1988 | European Pat. Off. . |
| 3602402 | 7/1987 | Germany . |
| 3614697 | 11/1987 | Germany . |
| 61-60701 | 3/1986 | Japan . |
| WO87/07618 | 12/1987 | WIPO . |

OTHER PUBLICATIONS

Muzzarelli, R. A. A., *The Polysaccharides* 3:417–450, & 439ff (1985).
Gummow, B. D. et al., *Makromol. Chem.* 186:1239–1244 (1985).
Kurita, K., in: "Proc. Int. Conf. Chitin/Chitosan", 287–293 (1985).
*Chitin in Nature and Technology in:* "proc. 3rd Int. Conf. Chitin/Chitsan", R. Muzzarelli, C. Jeuniaux and G. Gooday (eds), Plenum Press, N.Y. 1986.
Koyama, Y. et al., *J. Appl. Polymer Sci.* 31:1951–1954 (1986).
Levesque, G. et al., *Makromol. Chem.* 188:1659–1664 (1987).
Kurita, K., "Binding of Metal Cations by Chittin Derivatives: Improvement of Adsorption Ability Through Chemical Modifications," in *Industrial Polysaccharides:- Genetic Engineering, Structure/Property Relations and Applications,* M. Yalpani (ed), Elsevier Science Pubs., B.V., Amsterdam, 1958, 337–346.
Blair, H. S. et al., *J. Appl. Polymer Sci.* 33:641–656 (1987).
Muzzarelli, R. A. A., *Carbohydrate Polymers* 8:1–21 (1988).
Kurita, K. et al., *Int. J. Biol. Macromol.* 10:124–125 (1988).
Seo, T. et al., *J. Appl. Polymer Sci.* 36:1443–1451 (1988).
Chemical Abstracts, vol. 105, No. 14 (1986).

PROCESS FOR THE PREPARATION OF ACTIVATED CHITOSANS AND THEIR USE IN THE PREPARATION OF CHIOTSAN DERIVATIVES

This application is a continuation of application Ser. No. 07/476,263 filed on Feb. 7, 1990, now abandoned.

The present invention relates to the preparation of activated chitosans and their use in the preparation of chitosan derivatives, it being possible to obtain both water-soluble and water-insoluble products.

Chitosan is a polysaccharide consisting of aminoglucose units and is commercially available. It is prepared starting from chitin, a polysaccharide consisting of N-acetylaminoglucose units, via alkaline saponification of the N-acetyl groups. Chitin is a natural product and contained in crustaceans and fungal hyphae as a structural component.

In commercially available chitosan, usually 60 to 90% of the N-acetyl groups which are originally present in the chitin are saponified. The mean degree of polymerization (MP) is generally in the range of from 500 to 10,000, while, in the case of native chitin, it is always higher than 5,000.

A large number of chitosan derivatives, their properties, preparation processes and the various fields of application are described in the literature.

For example, information on the fields of application can be found in "The Polysaccharides, Vol. 3, pp. 439 et seq., Academic Press ( 1985 )" and "Carbohydrate Polymers 3 (1983), pages 53–75".

Detailed literature reviews can furthermore be found in R. A. A. Muzzarelli in "Chitin, Pergamon Press (1977)" and in "Chitin in Nature and Technology, Plenum Press (1986)". Moreover, information can be found in this literature on the preparation of various chitosan derivatives, for example of chitosan nitrates, sulfates, sulfonates, sulfonium salts, xanthates, as well as preparation instructions for carboxymethyl-, sulfoethyl-benzyl-, acyl-, alkyl-, N,N,N-trialkyl-, hydroxyalkyl- and cyano-ethylchitosans, phosphorylated chitosans and Schiff's bases of chitosan.

In addition, information on the customary procedure according to the prior art in the preparation of chitosan derivatives can be found in the following references. In "J. Membrane Science 16 (1983), pages 295–308", R. A. A. Muzzarelli describes the reaction of chitosan with aliphatic aldehydes and the subsequent reduction with NaBH$_4$. The reaction is carried out in a homogeneous solution of acetic acid. Increase of the pH to 10 results in precipitation of the products.

The papers by R. A. A. Muzzarelli, "The Polysaccharides, Vol. 3 (1985), pages 417–450" and by K. Kurita, "Proc. Int. Conf. Chitin, Chitosan (1985), pages 287–293" as well as "Industrial Polysaccharides: Genetic Engineering, Structure/Property Relations and Applications, Elsevier Science Publishers B. V. (1987), pages 337 to 346" discuss in greater detail the acylation of chitosan. This process is carried out either homogeneously or heterogeneously on chitosan which has been activated via reprecipitation from acid solution. In addition, the two authors research into reductive amination; K. Kurita moreover researches into carboxymethylation, sulfation, cyanoethylation and graft polymerization.

The graft polymerization of acrylamide, methyl methacrylate and vinyl acetate on chitosan is described in the reference "H. S. Blair et al., J. Appl. Polymer Science 33 (1987), pages 641–656". The reactions are carried out both homogeneously and heterogeneously on unprecipitated, activated chitosan.

In "Carbohydrate Polymers 8 (1988), pages 1–21", R. A. A. Muzzarelli discusses the various possibilities of carboxymethylation of chitosan. The reactions are generally carried out in the presence of alkalis.

Other preparation instructions for chitosan derivatives can be found, inter alia, in the following references:

Int. J. Biol. Macromol. 10 (1988), pages 124–125, Int. J. Biol. Macromol. 4 (1982), pages 246–249, Int. J. Biol. Macromol. 3 (1981), pages 292–296, J. Chem. Soc., Chem. Comm. (1980), pages 1153–1154, J. Appl. Polymer Science 31 (1986), pages 1951–1954, J. Appl. Polymer Science 36 (1988), pages 1443–1451, Makromol. Chem. 188 (1987), pages 1659–1664, Makromol. Chem. 186 (1985), pages 1239–1244, Carb. Res. 83 (1980), pages 389–393 as well as in U.S. application Ser. No. 4,424,346 and EP-A 0,249,779.

DE-A 3,614,697 describes cosmetics on the basis of N-hydroxybutyl-chitosans and their preparation. For this purpose, chitosan, comprising 60 to 96% of deacetylated chitin or salts thereof, is reacted with butylene oxide in a suitable ratio. If appropriate, the chitosan or its salt can be reacted in the presence of acid catalysts, in a dispersion or solution, comprising water and an organic solvent.

DE-A 3,602,402, EP-A 0,224,045 (=U.S. application Ser. No. 4,780,310) and EP-A 0,277,322 deal analogously with N-hydroxyethylchitosans, N-hydroxypropylchitosans and N-hydroxypropyl ethers of chitosan. They are prepared analogously to N-hydroxybutyl-chitosan.

As the prior art, mention must be made furthermore of EP-A 0,115,574, DE-A 3,502,833 (=U.S. application Ser. No. 4,772,690) and DE-A 3,501,891 (=U.S. application Ser. No. 4,772,689), which deal with chitosan derivatives containing ammonium groups and, preferably, additionally hydroxyalkyl groups. These derivatives are prepared from chitosan, glycidyl trialkylammonium halides and ethylene oxide, propylene oxide or glycidol in water or aqueous-organic medium analogously to the procedure described above for the reaction with butylene oxide.

In DE-A 3,614,697, 3,501,891, 3,502,833, EP-A 0,115,574, 0,224,045 and 0,277,322, which are mentioned above, either non-activated chitosan or activated chitosan which has been obtained via reprecipitation from acid solution, is used.

JP-A 61-60701 likewise deals with the preparation of chitosan derivatives containing quaternary ammonium groups and, preferably, additionally hydroxyalkyl groups. These derivatives are prepared heterogeneously in aqueous-organic suspending agents, without dissolution of the products, via reacting chitosan with quaternary alkylammoniumalkyl halides, glycidyl trialkylammonium halides and alkylene oxides, in the presence of aqueous sodium hydroxide solution.

EP-A 0,193,736 describes the single-step or two-step reaction of chitosan with propylene oxide and ethyl chloride in the presence of sodium hydroxide solution in organic-aqueous suspension, and the application of products in cosmetics. In one variant, the chitosan is activated before the reaction with alkali treatment, pressing out the liquid and repeatedly freezing the product.

In principle, four groups of processes for the preparation of chitosan derivatives are known from the prior art, the processes being carried out with or without activation.

One group comprises a process involving homogeneous chitosan salt solutions. Since the process batch must be highly diluted because of the high viscosity, large reaction volumes are necessary, and considerable amounts of solvents are the result which are required for the solution (usually 1% strength) of the chitosan salts and for the precipitation of the chitosan derivatives at a later point in time.

Another group involves the direct reaction of chitosan with the appropriate reagents in aqueous, or organic, dispersion. In this process, admittedly, the undesirable high amounts of solvents of the homogeneous chitosan salt solutions can be avoided; however, the reaction appears to be irregular and incomplete. In some cases, most of the products dissolve towards the end of the reaction, which means that the favorable process conditions of the heterogeneous conduct of the reaction are again lost.

In another group, the chitosan is treated with an alkali, that is to say, alkalized before the formation of derivatives. The reaction is carried out in water or aqueous-organic solvents. In this procedure too, an irregular reaction must be expected, and, additionally, rapid degradation of the polymer chain appears due to the highly alkaline conditions.

In the two last-mentioned process groups, the introduction of highly hydrophobic substituents of wide spatial extension, have not been described.

In another group, the chitosan (about 1% of substance) is dissolved in aqueous or aqueous-alcoholic solution by the addition of acid, and reprecipitated with an alkali to give a voluminous gel. The chitosan which has been activated in this manner is subsequently reacted either in water, in aqueous-organic suspension or, after washing with an organic solvent, in anhydrous, organic suspension. In most cases, the products dissolve towards the end of the reaction. A considerable disadvantage is that both during the activation and the reaction, the process batch must be highly diluted because of the high viscosity of the chitosan solutions and the high water retention capacity of the activated chitosan. Hence, large reaction volumes are required. Moreover, the activated chitosan is difficult to handle in the procedure because of its high degree of swelling.

The first aim was to develop an operationally simple and universal process for the activation of chitosan, which process facilitates good digestion of the chitosan and allows this to be carried out using small reaction volumes.

A further object was to react the activated chitosan to be prepared uniformly and in a simple manner to give chitosan derivatives, again without expecting high volumes in the reaction. In addition, the possibility was to be provided to also prepare chitosan derivatives having highly hydrophobic substituents of wide spatial extension.

The first aim is achieved in a process for the activation of chitosan by adding acid for salt formation, preferably followed by adding bases, the characterizing feature of this process being that the addition of acid as well as the addition of bases which is preferably effected, are carried out in a suspending agent which largely prevents the chitosan salts from dissolving.

The second aim starts with a process in which activated chitosan is reacted with reagents suitable for the formation of chitosan derivatives, the characterizing feature of this process being that the products prepared by the activation process according to the invention are employed.

The suspending agent which is employed during the activation step is preferably the aqueous solution especially of an inorganic salt, the salt content being maintained at such a level that it is ensured that most of the chitosan salts do not dissolve. Depending on the salt used, the salt content is preferably between 2% by weight and the saturation limit, in particular at 5 to 20% by weight. The salts which are preferably employed for the suspension medium are chlorides, nitrates, sulfates or acetates which are readily soluble in water. The use of alkali metal salts or ammonium metal salts, such as, for example, NaCl, $Na_2SO_4$, KCl, $NH_4Cl$, $(NH_4)_2SO_4$ or Na acetate, or alkaline earth metal salts, such as, for example, $CaCl_2$, $MgCl_2$ or $MgSO_4$, have proved particularly suitable.

In the case of organic suspending agents, the proportion of the organic phase to the proportion of water—depending on the organic agent—must of course likewise be maintained at such a level that the solution of the chitosan salts formed is largely prevented. Relative to 100% of mixture of water and organic phase, the proportion of the organic agent is preferably 40 to 60% by weight.

The organic agents are preferably selected from amongst the group of the alcohols (for example ethyl alcohol, methyl alcohol, isopropyl alcohol and tert.-butyl alcohol), ethers (for example dioxane, dimethyl glycol or tetrahydrofuran), ketones (for example acetone or methyl ethyl ketone), aromatic compounds (for example toluene) or hydrocarbons.

The ratio in which suspending agent is added relative to chitosan is preferably 5-15:1, in particular 8-12:1.

In principle, any chitosan can be employed as starting material for the activation. However, it is preferred to employ chitosans which are deacetylated to an extent of 40 to 96% relative to the original chitin and which have a mean degree of polymerization (MP) of from 100 to 10,000, preferably of from 500 to 8,000.

Examples of acids which can be employed for the acidification of the chitosan are preferably HCl, $HNO_3$, $H_2SO_4$, acetic acid and others. Examples of bases which are employed in the alkali treatment are preferably NaOH, KOH, $NH_4OH$, $Mg(OH)_2$ and $Ca(OH)_2$.

The system "NaCl-salt solution/HCl/NaOH" is particularly preferably used in the activation.

It has emerged that a pH of from 1 to 5, in particular of from 2 to 3, is preferably maintained during the acidification of the chitosan, and a pH of from 8 to 13, in particular of from 9 to 11, after the addition of base which is preferably to be effected.

Even though the chitosan can basically be employed in the commercially available form, it has proved advantageous to select a particular particle size. Good results are obtained using particle sizes of <1 mm, preferably of from 0.05 to 0.2 mm.

During activation, the temperatures are maintained at about 20° to 150° C., in particular at 50° to 70° C., which also depends on the suspending agent employed. The activation is advantageously carried out while stirring, it being possible to use conventional stirring equipment.

The activation period depends on the temperature which has been adjusted, and is generally between 5 and 600 minutes. Sufficient activation times are preferably between 10 and 60 minutes. Before the products which have been activated according to the invention are treated further with reagents which are suitable for the reaction with polysaccharides or amines and which are generally known, they can be separated, for example by filtration, freed from salts and suspending agents, for example by washing, and, if appropriate, dried.

A separation and washing procedure is preferably carried out in those cases in which salt solutions are employed as suspending agents, so as to avoid the salts having a troublesome effect when the products are processed further to give chitosan derivatives.

If appropriate, it is also necessary to displace the water from the activated chitosan using suitable measures, for example by extraction with organic agents, such as alcohols, dioxane and formamide, when it is intended to use reagents in the formation of derivatives which are sensitive to hydrolysis.

The process for the preparation of chitosan derivatives comprises the chitosan products which have been activated according to the invention being reacted in the presence of water, organic agents or in aqueous-organic phase with reagents which are known from the prior art and are suitable for the reaction with polysaccharides or amines. The reaction is preferably effected in suspension. During the reaction of the chitosan products which have been activated according to the invention, it is also possible to introduce highly hydrophobic substituents of wide spatial extension into the chitosan derivatives.

The reactions can be carried out either without catalyst or, in the acid pH range, in the presence of acid catalysts (for example acetic acid or hydrochloric acid), or, in the alkaline pH range, in the presence of bases (for example alkali metal hydroxides or tert. amines). When, for example, alkylating reagents are employed, derivatives are preferentially formed on the nitrogen when the process is carried out in a neutral or acid medium, and derivatives are preferentially formed on the oxygen when the process is carried out in an alkaline medium.

The reaction times and temperatures are specific for the product of the particular reagent employed, and largely correspond to the information of the prior art.

The chitosan derivatives are worked up in a customary manner, for example by filtration or purification, for example in the form of an extraction of the by-products and the reagents which have been used in the reaction and not consumed, and/or the agent in which the reaction had been carried out, or by drying.

The reaction can be carried out with one or more reagent(s), which are employed in combination or, alternatively, in succession. If appropriate, an intermediate isolation can be carried out, for example with filtration, purification and drying. Which process steps are to be selected depends largely on the end products to be prepared and can be determined without difficulty.

Examples of reagents which can be reacted with the chitosan which has been activated according to the invention are, for example, alkylene oxides, such as ethylene oxide, propylene oxide, butylene oxide, glycidol, 1,2-epoxydodecane, 1,2-epoxyhexadecane, glycidyltrimethylammonium chloride, glycidyl ethers (for example glycidyl isopropyl ether), alkyl halides (for example methyl chloride, ethyl chloride or stearyl chloride), acid anhydrides (for example acetic anhydride), vinyl compounds (for example methyl vinyl ketone, acrylonitrile), aldehydes (for example acetic aldehyde, nonane aldehyde, glyoxylic acid), reactive halogen compounds (for example sodium chloroacetate, β-chloroethane sulfonate, chlorosulfonic acid or carboxylic acid chlorides), phosphorus pentoxide, cyanamides and compounds which can be grafted by means of free radicals (for example by diallyldimethylammonium chloride or acrylonitrile) in the presence of a free-radical initiator. If multifunctional reagents are employed, the result are crosslinked chitosan derivatives. The reaction with aldehydes is advantageously carried out in the presence of a suitable reducing agent, such as, for example, sodium cyanoborohydride, so that the N-alkyl derivatives are obtained directly.

Chitosan derivatives can be used for a very wide range of purposes. They include the following: sludge drainage, application in drilling sludge, thickener (for example in concrete compositions), auxiliaries in the paper and textile industries, absorbents (for example for water or blood), additives to foodstuffs and feed, manufacture of membranes, films and fibers, coating agents, plastics components, separating agents (for example for separating metal ions from aqueous solutions), flocculating agents, application in chromatography, molecular sieves, application in cosmetics (for example for shampoos, toothpaste, hair sprays, nail varnish etc.), application in fungicides (for example in agriculture), use in immunology, in biochemistry (for example for the immobilization or separation of enzymes) and in medicine, as well as in medical equipment.

In the examples below, the preparation according to the invention of activated chitosan as well as the preparation of various chitosan derivatives is illustrated in greater detail, without restricting the invention to the use examples below.

PROCESS FOR THE ACTIVATION OF CHITOSAN

Method A 10 parts of chitosan (MP~8,000; degree of acetyl substitution~0.29) of a particle size of <0.1 mm are suspended in 100 parts of an aqueous NaCl solution (NaCl 10% by weight), and the stirred suspension is treated with 4.35 parts of HCl (37% strength). The pH of the suspension is 2.7. The mixture is subsequently stirred for 45 minutes at 60° C., cooled to room temperature, and such an amount of aqueous 50% strength NaOH solution is added to the stirred mixture that the pH is 10.0. The activated chitosan is subsequently filtered off with suction, washed with water until free from salts and pressed until the water content is around 80%.

Method B 10 parts of the chitosan used in method A are suspended in 80 parts of an aqueous suspending agent (proportion of isopropanol: 50%), and the stirred suspension is treated with 4.35 parts of HCl (37% strength). The pH of the suspension is 2.5. The mixture is subsequently stirred for 60 minutes at 60° C., cooled to room temperature, and such an amount of 50% strength aqueous NaOH solution is added to the stirred mixture that the pH is 9.0.

When chitosans of lower molecular weight (MP~500 to 1,000) are employed in methods A and B, more hydrochloric acid is required because of the higher content of free amines. Only simple experiments are necessary to adjust the pH required, which should be in the acid range.

II. PROCESS FOR THE PREPARATION OF CHITOSAN DERIVATIVES

EXAMPLE 1

263 g of a high-molecular chitosan which has been activated by method A and washed until free from salts ($H_2O$ content 80.9%) are suspended in 260 g of pure isopropanol. 52.7 g of glycidol (95% of substance) and 64.6 g of glycidyl trimethylammonium chloride (70% of substance) are added with stirring. The suspension is stirred for 6 hours at 80° C. After cooling, the solid is filtered off with suction and extracted using 75% pure isopropanol, and the reaction product is dried. The chitosan derivative obtained has degrees of substitution of 1.1 of glycidyl, 0.27 of quaternary ammonium groups and 0.25 of acetyl.

EXAMPLE 2

50 g of a high-molecular chitosan which has been activated by method B are treated with 80 g of pure isopropanol, without isolation, until the suspension has an isopropanol content of 55%. The reaction and working up are carried out analogously to the conditions of Example 1. The chitosan derivative obtained has degrees of substitution of 1.1 of glycidyl, 0.32 of quaternary ammonium groups and 0.24 of acetyl.

EXAMPLE 3 (COMPARISON ACCORDING TO THE PRIOR ART)

50 g of high-molecular chitosan, as is present before activation by methods A or B, is treated with 500 g of 55% pure isopropanol. The same compounds in the same amounts as in Example 1 are added with stirring. The chitosan derivative obtained has degrees of substitution of 1.0 of glycidyl, 0.27 of quaternary ammonium groups and 0.26 of acetyl.

EXAMPLE 4 (COMPARISON ACCORDING TO THE PRIOR ART)

50 g of high-molecular chitosan, as is present before activation by methods A or B, is suspended in 500 g of 80% pure isopropanol, the suspension is treated with 25 g of glycidyl trimethylammonium chloride (70% of substance) and stirred for 5 hours at 60° C. 20.7 g of aqueous NaOH solution (15% strength) are then added, the mixture is treated with 40.5 g of glycidol (95% of substance) and stirred at 60° C. for 5 more hours. The mixture is subsequently rendered neutral using acetic acid, the solid is filtered off with suction, and the chitosan derivative is extracted using 80% pure isopropanol and dried. The chitosan derivative obtained has degrees of substitution of 1.1 of glycidyl, 0.26 of quaternary ammonium groups and 0.06 of acetyl.

While the products of Examples 1 and 2 are readily soluble in water and have insoluble residues of only 3.8%, which is acceptable, the products which have been prepared by Comparison Examples 3 and 4 are sparingly soluble and have 16.0 and 13.9%, respectively, of insoluble residues. Because of the relatively high percentage of insoluble components, such products as are prepared by the comparison examples cannot be employed for all purposes.

In the following examples for the preparation of water-soluble chitosan derivatives, a chitosan product which has been activated by method A according to the invention is used.

EXAMPLE 5

250 g of a high-molecular chitosan which has been activated according to the invention ($H_2O$ content ~80%) are suspended in such an amount of tert. butanol, isopropanol or acetone that the water content in the suspending agent is in the range of from 40 to 50%. The pH is 9 to 10.

Various amounts of glycidyl trimethylammonium chloride (70% of substance, 37.7 to 62.5 g) and ethylene oxide (25.5 to 63.8 g) are added. The suspension is stirred at 90° C. for about 8 to 10 hours. After it has cooled down, the solid is filtered off with suction. The derivatives are extracted using about 80% strength acetone and dried.

Depending on the amount of substances employed, the degrees of substitution are 1.6 to 2.5 of hydroxyethyl and 0.19 to 0.29 of quaternary ammonium groups. The degrees of substitution with acetyl are in the range of from 0.22 to 0.26.

Example 5 is carried out in two steps using acetone as the suspending agent, the reaction first being carried out for 4 hours at 80° C. with 37.7 g of glycidyl trimethylammonium chloride (70% of substance) and then for 9 hours at 80° C. with 63.8 of ethylene oxide. The degrees of substitution are 0.45 of quaternary ammonium groups, 2.5 of hydroxyethyl and 0.22 of acetyl.

The water-insoluble residues of all derivatives are below 0.2% by weight.

EXAMPLE 6

Following the procedure of Example 5, 250 g of activated, high-molecular chitosan is reacted with 37.7 g of glycidyl trimethylammonium chloride (70% of substance) and 67.3 g of propylene oxide, in the presence of 244 g of t-butanol as the suspending agent. Working up gives a chitosan derivative having degrees of substitution of 0.36 of quaternary ammonium groups, 1.3 of hydroxypropyl and 0.25 of acetyl.

The water-insoluble residue is 1.9% by weight.

EXAMPLE 7

209 g of a low-molecular chitosan which has been activated according to the invention ($H_2O$ content 76.1%) are suspended in 200 g of isopropanol or acetone. 113.1 g of propylene oxide are then metered in, and the suspensions are stirred for about 9.5 hours at 90° C. After the suspensions have cooled down, they are diluted with a little acetone, and filtered, and the solids are extracted using 90% strength acetone and dried. In both cases, the chitosan derivative has degrees of substitution of 2.0 of hydroxypropyl and 0.1 of acetyl.

The water-insoluble residue is 1.2% by weight.

EXAMPLE 8

107.5 g of a high-molecular chitosan which has been activated according to the invention, having a water content of 76.7% by weight, are suspended in a mixture of 123.8 g of t-butanol and 117.3 g of triethylamine. 106.1 g of methyl chloride are then metered in, and the mixture is stirred for 6 hours at 80° C. The reaction product is filtered off with suction, extracted in the neutral range using 80% strength isopropanol, freed from water using acetone, and dried. The resulting quaternary methyl chitosan has degrees of substitution of 0.7 of quaternary trimethylammonium groups and 0.22 of acetyl. It forms a clear solution in water and has a residue of only 0.1% by weight.

EXAMPLE 9

255 g of a high-molecular chitosan which has been activated according to the invention, having a water content of 80.4% by weight, are suspended in 307.5 g of acetone. After the pH has been adjusted to 9.5, 38.1 g of ethylene oxide are added, and the mixture is stirred for 10 hours at 90° C. After cooling, the mixture is treated with 12.6 g of acetic acid and reacted with 63.5 g of ethylene oxide for 6 more hours at 80° C. The reaction mixture is subjected to filtration with suction, and the solid is extracted using 80% strength acetone, freed from water using acetone, and dried. The resulting hydroxyethyl chitosan forms a clear solution in water. The water-insoluble residue is only 0.1% by weight. The derivative has degrees of substitution of 2.1 of hydroxyethyl, 0.14 of quaternary ammonium groups and 0.21 of acetyl.

If non-activated chitosans (of the prior art) are used for the preparation of the abovementioned derivatives in place of the chitosans which have been activated according to the invention, there are considerable water-insoluble residues in the products in all cases (about 12 to 14% by weight).

In the following examples for the preparation of water-insoluble chitosan derivatives, a high-molecular chitosan which has been activated by method B according to the invention is used, which has been filtered off from the suspending agent and washed with water.

EXAMPLE 10

474 g of a chitosan which has been activated according to the invention, having a water content of 78.9%, are suspended in 600 g of isopropanol. 213.4 g of 1,2-epoxydodecane or 278.4 g of 1,2-epoxyhexadecane are added, and the mixtures are stirred for 7 hours at 110° C. after the pH has been adjusted to 9.5. The mixtures are subsequently filtered, washed several times using 75% strength isopropanol, acetone and petroleum ether, and dried. The degrees of substitution are 0.77 of hydroxydodecyl and 0.29 of hydroxyhexadecyl, respectively, and 0.19 of acetyl in both cases.

N-Hydroxydodecyl chitosan is freely soluble in a 5% strength solution of LiCl in dimethylacetamide and soluble to some extent in dichloroacetic acid, while N-hydroxyhexadecyl chitosan only swells in these solvents. Both derivatives swell substantially in nonpolar solvents, such as toluene and petroleum ether.

EXAMPLE 11

30 g of N-hydroxydodecyl chitosan and 23.6 g of N-hydroxyhexadecyl chitosan, as prepared in Example 10, are suspended in 300 g of 80% strength t-butanol, and the stirred suspension is treated with 3.88 g of sodium hydroxide solution (50% strength). 56.3 g of propylene oxide are subsequently metered in, and the mixture is stirred for 10 hours at 90° C. After cooling, the mixture is rendered neutral using 4.9 g of HCl (36% strength), the solids are washed with water until free from salts and dried in vacuo at 60° C. The degrees of substitution are 0.7 of hydroxypropyl and 0.02 of acetyl in the case of the N-hydroxydodecyl chitosan derivative, and 2.1 of hydroxypropyl and 0.05 of acetyl in the case of the N-hydroxyhexadecyl derivative.

The resulting derivatives are soluble in dimethyl sulfoxide, dichloroacetic acid and a 5% strength solution of LiCl in dimethylacetamide, and, with substantial swelling, soluble to some extent in polyhydric alcohols, such as ethylene glycol, propylene glycol and chlorohydrin. They swell in monohydric alcohols, dimethylacetamide and dimethylformamide.

EXAMPLE 12

31 g of N-hydroxydodecyl chitosan or 23.8 g of N-hydroxyhexadecyl chitosan, as prepared in Example 10, are suspended in a mixture of 150 g of acetic acid and 250 g of acetic anhydride. After 1 g of perchloric acid has been added, the suspensions are stirred for 4 days at room temperature. The reaction mixture is diluted with water, and the solid is filtered off with suction, taken up in water, rendered neutral, washed with water until free from salts and dried in vacuo at 50° C. The degrees of substitution are 1.1 of acetyl in the case of the N-hydroxydodecyl derivative and 1.5 in the case of the N-hydroxyhexadecyl derivative.

The $C_{12}$-derivative is soluble in dichloroacetic acid, in a 5% strength solution of LiCl in dimethylacetamide and soluble to some extent in chlorohydrin. The $C_{16}$-derivative is only soluble in dichloroacetic acid. Both derivatives swell substantially in toluene, sulfolane, dimethyl sulfoxide, pyridine and ethanolamine.

EXAMPLE 13

248 g of a chitosan which has been activated according to the invention ($H_2O$ content 200 g) are suspended in 300 g of isopropanol and stirred together with 40.8 g of methyl vinyl ketone for 8 hours at 80° C. at a pH of 10. After cooling, the mixture is filtered and the solid is washed with 75% strength isopropanol, freed from water using acetone and dried.

The derivative (degree of substitution of 3-oxobutyl=1.4, of acetyl=0.14) is soluble to a high degree in a 5% strength solution of LiCl in dimethylacetamide and soluble to some extent, with substantial swelling, in dichloroacetic acid and chlorohydrin. Noticeable swelling is also observed in toluene and petroleum ether. The hydrochloride has a very good water absorption capacity and, in water, forms a gel.

EXAMPLE 14

454 g of a chitosan which has been activated according to the invention, having a water content of 404 g, are suspended in 600 g of methanol. 81.8 g of nonanal are added, and the pH is adjusted to 5.3 using HCl.

The stirred suspension is treated with 21.8 g of $Na.BH_3CN$. The pH which rises gradually is repeatedly adjusted to 6 every 3 to 4 days.

When the reaction is complete, the pH is adjusted to 11 using dilute sodium hydroxide solution, and the solid is filtered off with suction, extracted with water until free from salts and freed from water using acetone. It is subsequently washed with petroleum ether, and the product is dried in vacuo at 40° C. The degrees of substitution found are 1.4 of nonyl and 0.04 of acetyl.

Stirring the product for several days in 50% strength acetic acid does not result in any change in the nitrogen content of N-nonylchitosan. The product is completely soluble in dichloroacetic acid and soluble to a major degree in a 5% strength solution of LiCl in dimethylacetamide and in chlorohydrin. It swells greatly in toluene.

EXAMPLE 15

30 g of N-nonylchitosan, prepared according to Example 14, are suspended in 333 g of 90% strength t-butanol, and the suspension, which is stirred intensively, is treated with 3.6 g of sodium hydroxide solution (50% strength). 54 g of propylene oxide are subsequently metered in. The reaction mixture is stirred for 10 hours at 90° C. After cooling, the reaction mixture is rendered neutral using 4.6 g of HCl (36% strength) and diluted with water, and the product is filtered off with suction, washed with water and dried in vacuo at 50° C.

Hydroxypropyl-N-nonylchitosan has degrees of substitution of 0.8 of hydroxypropyl and of 0.01 of acetyl, and is soluble in dichloroacetic acid, a 5% strength solution of LiCl in dimethylacetamide and in chlorohydrin, and soluble to some extent in dimethyl sulfoxide. It swells greatly, preferably in longer-chain and polyhydric alcohols, such as, for example, in isobutanol, dodecanol, ethylene glycol, propylene glycol, as well as in dioxane, dimethyl glycol, methylene chloride, dimethylformamide and dimethylacetamide.

EXAMPLE 16

34.2 g of N-nonylchitosan as prepared in Example 14 are acetylated according to the procedure of Example 12. The degree of substitution with acetyl is 2.6.

Acetyl-N-nonylchitosan is soluble in dichloroacetic acid, a 5% strength solution of LiCl in dimethylacetamide and in chlorohydrin, soluble to a major degree in sulfolane and soluble to some extent in dimethyl sulfoxide. The product swells greatly in ethyl acetate, dimethyl glycol, acetone, toluene, methylene chloride, pyridine, dimethylformamide and dimethylacetamide.

EXAMPLE 17

229 g of a chitosan which has been activated according to the invention ($H_2O$ content 78.2%) are washed with methanol until free from water. The chitosan which is still moist with methanol is suspended in 200 g of methanol, and the suspension is treated with 116.5 g of dodecenylsuccinic anhydride and stirred for 17 hours at 70° C. After the mixture has cooled down and been subjected to filtration with suction, the solid is washed with 80% strength isopropanol until free from salts, and then with acetone. The product is dried in the air. It has a degree of substitution of 0.49 of succinyl and 0.28 of acetyl.

(3-Dodecenyl)-succinylchitosan is soluble to some extent in chlorohydrin only. It swells to a very large extent in dichloroacetic acid, a 5% solution of LiCl in dimethylacetamide, ethylene glycol, propylene glycol and sulfolane.

EXAMPLE 18

93.5 g of a chitosan which has been activated according to the invention ($H_2O$ content 81.5%) are washed with dioxane to displace the water which is still present. The moist product is suspended in 200 g of dioxane. After 27.7 g of anhydrous pyridine have been added, 52.9 g of isononanoic acid chloride are added dropwise to the stirred suspension, and the suspension is stirred for 3 days at room temperature. The reaction product is taken up in water, filtered off with suction, then washed first at pH 11 and then at pH 7 with 80% strength acetone until free from salts and dried in vacuo at 50° C. The degrees of substitution found are 2.1 of isononanoyl and 0.29 of acetyl.

Isononanoylchitosan is only soluble in chloroacetic acid. In chlorohydrin, a 5% strength solution of LiCl in dimethylacetamide, pyridine and toluene, it swells greatly, in methylene chloride and sulfolane moderately.

In all the examples which relate to the water-insoluble products, no essential residues can be found when the products are dissolved in the solvents mentioned in each case, and no formation of lumps when the products swell, which allows the conclusion that the reaction rate in the preparation of the derivatives from the chitosans which have been activated according to the invention was appropriately high. As furthermore shown in the examples, it is also possible to introduce highly hydrophobic substituents having wide spatial extension into the chitosan having high degrees of substitution, if chitosans which have been activated according to the invention are employed as starting materials.

We claim:

1. A process for activating chitosan by adding acid for salt formation which comprises carrying out the addition of acid in a suspending agent consisting essentially of a chitosan and an aqueous solution of an inorganic salt, selected from the group consisting of chloride, nitrates, sulfate and acetates which are readily soluble in water,
wherein the aqueous solution of the inorganic salt substantially prevents the chitosan salts from dissolving.

2. The process as claimed in claim 1, wherein the chitosan employed has been comminuted to a particle size of less than 1 mm.

3. The process as claimed in claim 1, wherein the chitosan employed has been comminuted to a particle size of 0.05 to 0.2 mm.

4. The process as claimed in claim 1, wherein the salt content of the aqueous solution is 2% by weight up to the saturation limit.

5. The process as claimed in claim 4, wherein the salt content of the aqueous solution is 5 to 20% by weight.

6. The process as claimed in claim 1, wherein the activation is carried out at a temperature of from 20° to 150° C.

7. The process as claimed in claim 6, wherein the activation is carried out at 50° to 70° C.

8. The process as claimed in claim 1, wherein the activation is carried out during a period of from 1 to 600 minutes.

9. The process as claimed in claim 8, wherein the activation is carried out during a period of from 10 to 60 minutes.

10. The process as claimed in claim 1, wherein a pH of from 1 to 5 is maintained when the chitosan is acidified.

11. The process as claimed in claim 10, wherein a pH of from 2 to 3 is maintained.

12. The process as claimed in claim 1, wherein a pH of from 8 to 13 is maintained after an addition of a base.

13. The process as claimed in claim 12, wherein a pH of from 9 to 11 is maintained.

14. The process as claimed in claim 1, wherein the activation is carried out while stirring.

15. The process as claimed in claim 1, wherein the aqueous solution contains said inorganic salt.

16. A process for the preparation of water-soluble chitosan derivatives, which comprises reacting a chitosan which has been activated according to claim 1, with reagents which are suitable for reacting polysaccharides or amines comprising organic halogen compounds, selected from the group of alkyl halides, halocarbocyclic acids, salts of halocarbocyclic acids or reactive halogen compounds, or alkylene oxides, or glycidyl ethers, or acid anhydrides, or aldehydes, or vinyl compounds, or compounds which can be grafted by means of free radicals in the presence of a free radical initiator.

17. The process as claimed in claim 16, wherein a chitosan is employed which has been activated in aqueous, salt-containing suspension, filtered off after the activation, freed from salt residues by washing with solvents in which the salt is soluble, and dried.

18. The process as claimed in claims 16, wherein reagents are used for the reaction which are capable of forming water-soluble chitosan products.

19. The process as claimed in claim 16, wherein said reagents used in the reaction form water-insoluble chitosan products.

* * * * *